United States Patent
Yamamura

(10) Patent No.: US 10,482,502 B2
(45) Date of Patent: Nov. 19, 2019

(54) INFORMATION PROVISION SYSTEM, SPECIFIC-INFORMATION GENERATION DEVICE, AND SPECIFIC-INFORMATION GENERATION METHOD

(71) Applicant: Panasonic Intellectual Property Management Co., Ltd., Osaka (JP)

(72) Inventor: Toshiki Yamamura, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 486 days.

(21) Appl. No.: 15/013,236

(22) Filed: Feb. 2, 2016

(65) Prior Publication Data

US 2016/0148263 A1 May 26, 2016

Related U.S. Application Data

(63) Continuation of application No. PCT/JP2014/005404, filed on Oct. 24, 2014.

(30) Foreign Application Priority Data

Oct. 30, 2013 (JP) ................................ 2013-224943

(51) Int. Cl.
*G06Q 30/00* (2012.01)
*G06Q 30/02* (2012.01)
(52) U.S. Cl.
CPC ................................ *G06Q 30/0256* (2013.01)
(58) Field of Classification Search
None
See application file for complete search history.

(56) References Cited

U.S. PATENT DOCUMENTS 8,255,396 B2   8/2012   Sandoval et al.
2006/0248059 A1   11/2006   Chi et al.
(Continued)

FOREIGN PATENT DOCUMENTS

JP   2002-132645   5/2002
JP   2004-326150   11/2004
(Continued)

OTHER PUBLICATIONS

Extended European Search Report dated Dec. 20, 2016 in corresponding European Application No. 14857279.5.
(Continued)

*Primary Examiner* — Alvin L Brown
(74) *Attorney, Agent, or Firm* — Wenderoth, Lind & Ponack, L.L.P.

(57) ABSTRACT

An information provision system includes a first history collection device, a second history collection device, and a specific-information generation device. The specific-information generation device includes a history collector that acquires first history information and second history information, and a specific-information generator that generates specific information regarding an attribute and a preference of a user, based on the first history information and the second history information. The specific-information generator disposes, on a map of a thesaurus prepared in advance, a first keyword obtained from an access history of a Web terminal, and a second keyword obtained from a manipulation history of a household electric appliance terminal, and generates first specific information, based on the second keyword having a distance smaller than a predetermined distance from a disposed position of the first keyword disposed on the map.

6 Claims, 18 Drawing Sheets

(56) References Cited

U.S. PATENT DOCUMENTS

| | | | |
|---|---|---|---|
| 2007/0118542 A1 | 5/2007 | Sweeney | |
| 2007/0288448 A1* | 12/2007 | Datta | G06F 17/2795 |
| 2008/0195666 A1* | 8/2008 | Chi | G06F 17/30091 |
| 2008/0252413 A1 | 10/2008 | Ikeda | |
| 2009/0023393 A1* | 1/2009 | Behzad | H04W 12/06 |
| | | | 455/73 |
| 2011/0016396 A1* | 1/2011 | Maruyama | G11B 27/105 |
| | | | 715/716 |
| 2011/0238865 A1* | 9/2011 | Terashima | H04L 12/2805 |
| | | | 709/245 |
| 2011/0314502 A1* | 12/2011 | Levy | H04N 7/106 |
| | | | 725/46 |
| 2012/0259855 A1* | 10/2012 | Mizuguchi | G06F 17/3071 |
| | | | 707/739 |
| 2013/0198125 A1 | 8/2013 | Oliver et al. | |

FOREIGN PATENT DOCUMENTS

| | | |
|---|---|---|
| JP | 2005-173865 | 6/2005 |
| JP | 2005-310094 | 11/2005 |
| JP | 2008-262362 | 10/2008 |
| JP | 2010-501947 | 1/2010 |
| JP | 2011-155445 | 8/2011 |
| JP | 2012-133780 | 7/2012 |
| JP | 2012-141658 | 7/2012 |
| WO | 01/11506 | 2/2001 |
| WO | 2008/025167 | 3/2008 |

OTHER PUBLICATIONS

International Search Report dated Jan. 27, 2015 in corresponding International Application No. PCT/JP2014/005404 (with English translation).

* cited by examiner

FIG. 3

| Network identifier (IP address) | Access time | Keyword included in first history information | | | | |
|---|---|---|---|---|---|---|
| | | KW1 | KW2 | KW3 | KW4 | ... |
| AA:BB:CC:DD | 2013.10.01 08:00:25 | Fishing | Camping | Nature | | ... |
| EE:FF:GG:HH | 2013.10.04 12:30:00 | Sports | Soccer | News | | ... |
| JJ:KK:LL:MM | 2013.10.06 20:00:00 | Travel | Information | Package Tour | | ... |
| NN:OO:PP:QQ | 2013.10.10 01:00:45 | Animation | TV program | | | ... |
| ... | ... | ... | ... | ... | ... | ... |

FIG. 4

| Network identifier (IP address) | Household electric appliance terminal identifier (MAC address) | Use time | Keyword included in second history information | | | | |
|---|---|---|---|---|---|---|---|
| | | | KW1 | KW2 | KW3 | KW4 | ... |
| AA:BB:CC:DD | ABCDEFGHIJ | 2013.10.01 21:00:00~ 2013.10.01 22:00:00 | Mountain Stream Fishing | River | Lure | Autumn | ... |
| EE:FF:GG:HH | KLMNOPQRS | 2013.10.04 17:00:00~ 2013.10.04 17:30:00 | Fairyland | The season for outings | Fairy Mouse | Fairy Castle | ... |
| JJ:KK:LL:MM | VWXYZABCD | 2013.10.02 08:00:00~ 2013.10.02 08:15:00 | Ocean Football Club | P1 Soccer League | Soccer | Sports | ... |
| NN:OO:PP:QQ | EFGHIJKLMN | 2013.10.06 19:00:00~ 2013.10.06 20:54:00 | Hot Spring | Japanese-style Hotel | Kyushu | Beppu Jigoku-Meguri | ... |
| | | 2013.10.10 21:00:00~ 2013.10.10 21:54:00 | Marmoset George | Monkey | Picture Book | | ... |
| ... | | ... | ... | ... | ... | ... | ... |

FIG. 8

| Network identifier (IP address) | Specific information | | | | |
|---|---|---|---|---|---|
| | Attribute information 1 | Attribute information 2 | ... | Preference information 1 | Preference information 2 | ... |
| AA:BB:CC:DD | Male 25~34 | — | ... | Fishing: Mountain Stream Fishing | Camping: Auto-camping | ... |
| EE:FF:GG:HH | Male 18~24 | — | ... | Soccer: Ocean Football Club | Animation: Attack on Goblin | ... |
| JJ:KK:LL:MM | Male 45~54 | Female 45~54 | ... | Travel: Hot Spring | Gardening: Kitchen garden | ... |
| NN:OO:PP:QQ | Female 25~34 | Female kids | ... | Animation: Marmoset George | Shopping: Accessories | ... |
| ... | ... | ... | ... | ... | ... | ... |

FIG. 10A

| Network identifier (IP address) | Attribute information 1 | Attribute information 2 | First specific information ||||
|---|---|---|---|---|---|---|
| | | | | Preference information 1 | Preference information 2 | ⋮ |
| AA:BB:CC:DD | Male 25~34 | — | ⋮ | Fishing: Mountain Stream Fishing | Camping: Auto-camping | ⋮ |
| EE:FF:GG:HH | Male 18~24 | — | ⋮ | Soccer: Ocean Football Club | Animation: Attack on Goblin | ⋮ |
| JJ:KK:LL:MM | Male 45~54 | Female 45~54 | ⋮ | Travel: Hot Spring | Gardening: Kitchen garden | ⋮ |
| NN:OO:PP:QQ | Female 25~34 | Female kids | ⋮ | Animation: Marmoset George | Shopping: Accessories | ⋮ |
| ⋮ | ⋮ | ⋮ | ⋮ | ⋮ | ⋮ | ⋮ |

FIG. 10B

| Network identifier (IP address) | Second specific information ||||| 
| | Attribute information 1 | Attribute information 2 | ... | Preference information 1 | Preference information 2 | ... |
| --- | --- | --- | --- | --- | --- | --- |
| AA:BB:CC:DD | Female 25~34 | — | ... | Travel: Fairyland | ... | ... |
| EE:FF:GG:HH | — | — | ... | — | — | ... |
| JJ:KK:LL:MM | — | — | ... | — | — | ... |
| NN:OO:PP:QQ | — | — | ... | — | — | ... |
| ... | ... | ... | ... | ... | ... | ... |

FIG. 12

| Network identifier (IP address) | Web terminal identifier (Cookie) | Access time | Keyword included in first history information | | | | |
|---|---|---|---|---|---|---|---|
| | | | KW1 | KW2 | KW3 | KW4 | .. |
| AA:BB:CC:DD | 12345678 | 2013.10.01  08:00:25 | Fishing | Camping | Nature | | .. |
| EE:FF:GG:HH | 34896549 | 2013.10.04  12:30:00 | Sports | Soccer | News | | .. |
| JJ:KK:LL:MM | 12345678 | 2013.10.06  20:00:00 | Food | Navigation | | | .. |
| AA:BB:CC:DD | 78694587 | 2013.10.10  01:00:45 | Travel | Shopping | | | .. |
| .. | .. | .. | .. | .. | .. | .. | .. |

FIG. 14

| Network identifier (IP address) | Web terminal identifier (Cookie) | First specific information ||||...|
|---|---|---|---|---|---|---|
| | | Attribute information 1 | Attribute information 2 | ... | Preference information 1 | Preference information 2 |
| AA:BB:CC:DD | 12345678 | Male 25~34 | — | ... | Fishing: Mountain Stream Fishing | Food: Dining Out |
| JJ:KK:LL:MM | | | | | | |
| EE:FF:GG:HH | 34896549 | Male 18~24 | — | ... | Soccer: Ocean Football Club | Animation: Attack on Goblin |
| AA:BB:CC:DD | 78694587 | Female 25~34 | — | ... | Travel: Fairyland | Shopping: Mail-order sales |
| ... | ... | ... | ... | ... | ... | ... |

FIG. 16A

| Network identifier (IP address) | Web terminal identifier (Cookie) | First specific information ||||||
|---|---|---|---|---|---|---|---|
| | | Attribute information 1 | Attribute information 2 | .. | Preference information 1 | Preference information 2 | .. |
| AA:BB:CC:DD | | | | | | | |
| JJ:KK:LL:MM | 12345678 | Male 25~34 | — | .. | Fishing: Mountain Stream Fishing | Food: Dining Out | .. |
| EE:FF:GG:HH | 34896549 | Male 18~24 | — | .. | Soccer: Ocean Football Club | Animation: Attack on Goblin | .. |
| AA:BB:CC:DD | 78694587 | Female 25~34 | — | .. | Travel: Fairyland | Shopping: Mail-order sales | .. |
| .. | .. | .. | .. | .. | .. | .. | .. |

FIG. 16B

| Network identifier (IP address) | Web terminal identifier (Cookie) | Second specific information ||||||
|---|---|---|---|---|---|---|---|
| | | Attribute information 1 | Attribute information 2 | ... | Preference information 1 | Preference information 2 | ... |
| AA:BB:CC:DD | 12345678 | Female 25~34 | Male kids | ... | Travel: Fairyland | Animation: Electric Shock Monster | ... |
| JJ:KK:LL:MM | — | — | — | ... | — | — | ... |
| EE:FF:GG:HH | — | — | — | ... | — | — | ... |
| AA:BB:CC:DD | 78694587 | Male 25~34 | Male kids | ... | Fishing: Mountain Stream Fishing | Animation: Electric Shock Monster | ... |
| ... | ... | ... | ... | ... | ... | ... | ... |

INFORMATION PROVISION SYSTEM, SPECIFIC-INFORMATION GENERATION DEVICE, AND SPECIFIC-INFORMATION GENERATION METHOD

BACKGROUND

1. Field of the Disclosure

The present disclosure relates to an information provision system that generates attribute information and preference information of a user, a specific-information generation device, and a specific-information generation method.

2. Background Art

Unexamined Japanese Patent Publication No. 2012-133780 (Patent Literature 1) discloses a user behavior information collection system. This system collects user behavior information related to interests of the user from a first medium configuring an advertisement network. When the user visits a second medium or when the user uses service provided by the second medium, an advertisement targeting the user is provided to the user, based on the user behavior information.

Unexamined Japanese Patent Publication No. 2012-141658 (Patent Literature 2) discloses a sever device. This server device generates first preference information of a user from a search history of information search using a portable terminal. Moreover, the server generates second preference information of the user from a manipulation history of an information household electric appliance by the same user as the user who has performed the information search using the portable terminal. Using the first and second preference information, a category of data to be delivered to at least one of the information household electric appliance and the portable terminal is generated.

SUMMARY

The present disclosure provides an information provision system that generates attribute information and preference information of a user, and provides the generated information to an external advertisement provision system or the like, a specific-information generation device, and a specific-information generation method.

An information provision system in the present disclosure is connected to an in-home network configured by a Web terminal and a household electric appliance terminal, and includes a first history collection device, a second history collection device, and a specific-information generation device. In this information provision system, the first history collection device acquires, from the Web terminal, first history information including an access history of the Web terminal and a network identifier of the Web terminal. The second history collection device acquires, from the household electric appliance terminal, second history information including a manipulation history of the household electric appliance terminal, a household electric appliance terminal identifier of the household electric appliance terminal, and a network identifier of the household electric appliance terminal. The specific-information generation device includes a history collector and a specific-information generator. The history collector acquires the first history information from the first history collection device, and the second history information from the second history collection device. The specific-information generator generates specific information regarding an attribute and a preference of a user, based on the first history information and the second history information acquired in the history collector. The specific-information generator disposes, on a map of a thesaurus prepared in advance, a first keyword obtained from the access history of the Web terminal, and a second keyword obtained from the manipulation history of the household electric appliance terminal, and generates first specific information, based on a single or a plurality of the second keywords having a distance smaller than a predetermined distance from a disposed position of the first keyword disposed on the map.

A specific-information generation device in the present disclosure includes a history collector and a specific-information generator. The history collector acquires first history information including an access history of a Web terminal and a network identifier of the Web terminal from a first history collection device connected to an in-home network configured by the Web terminal and a household electric appliance terminal, and acquires second history information including a manipulation history of the household electric appliance terminal, a household electric appliance terminal identifier of the household electric appliance terminal, and a network identifier of the household electric appliance terminal from a second history collection device connected to the in-home network. The specific-information generator generates specific information regarding an attribute and a preference of a user, based on the first history information and the second history information acquired in the history collector. The specific-information generator disposes, on a map of a thesaurus prepared in advance, a first keyword obtained from the access history of the Web terminal, and a second keyword obtained from the manipulation history of the household electric appliance terminal, and generates first specific information, based on a single or a plurality of the second keywords having a distance smaller than a predetermined distance from a disposed position of the first keyword disposed on the map.

A specific-information generation method in the present disclosure has the steps of acquiring first history information including an access history of a Web terminal and a network identifier of the Web terminal from a first history collection device connected to an in-home network configured by the Web terminal and a household electric appliance terminal, acquiring second history information including a manipulation history of the household electric appliance terminal, a household electric appliance terminal identifier of the household electric appliance terminal, and a network identifier of the household electric appliance terminal from a second history collection device connected to the in-home network, generating specific information regarding an attribute and a preference of a user, based on the acquired first history information and second history information, providing the specific information to a transmission source of a request in response to the request transmitted from outside, disposing, on a map of a thesaurus prepared in advance, a first keyword obtained from the access history of the Web terminal, and a second keyword obtained from the manipulation history of the household electric appliance terminal, and generating first specific information, based on a single or a plurality of the second keywords having a distance smaller than a predetermined distance from a disposed position of the first keyword disposed on the map.

The information provision system, the specific-information generation device, and the specific-information generation method according to the present disclosure are effective for generating the attribute information and the preference information of the user with increased accuracy.

BRIEF DESCRIPTION OF DRAWINGS

FIG. 3 is a diagram schematically showing one example of data accumulated in a database of a first history collection server in the first exemplary embodiment;

FIG. 4 is a diagram schematically showing one example of data accumulated in a database of a second history collection server in the first exemplary embodiment;

FIG. 8 is a diagram schematically showing one example of data generated in the specific-information generation server and accumulated in a specific-information database in the first exemplary embodiment;

FIG. 10A is a diagram schematically showing one example of first specific information generated in the specific-information generation server and accumulated in a specific-information database in the second exemplary embodiment;

FIG. 10B is a diagram schematically showing one example of second specific information generated in the specific-information generation server and accumulated in the specific-information database in the second exemplary embodiment;

FIG. 12 is a diagram schematically showing one example of data accumulated in a database of a first history collection server in the third exemplary embodiment;

FIG. 14 is a diagram schematically showing one example of data generated in the specific-information generation server and accumulated in a specific-information database in the third exemplary embodiment;

FIG. 16A is a diagram schematically showing one example of first specific information generated in the specific-information generation server and accumulated in a specific-information database in the fourth exemplary embodiment; and FIG. 16B is a diagram schematically showing one example of second specific information generated in the specific-information generation server and accumulated in the specific-information database in the fourth exemplary embodiment.

DETAILED DESCRIPTION

Figure 1:
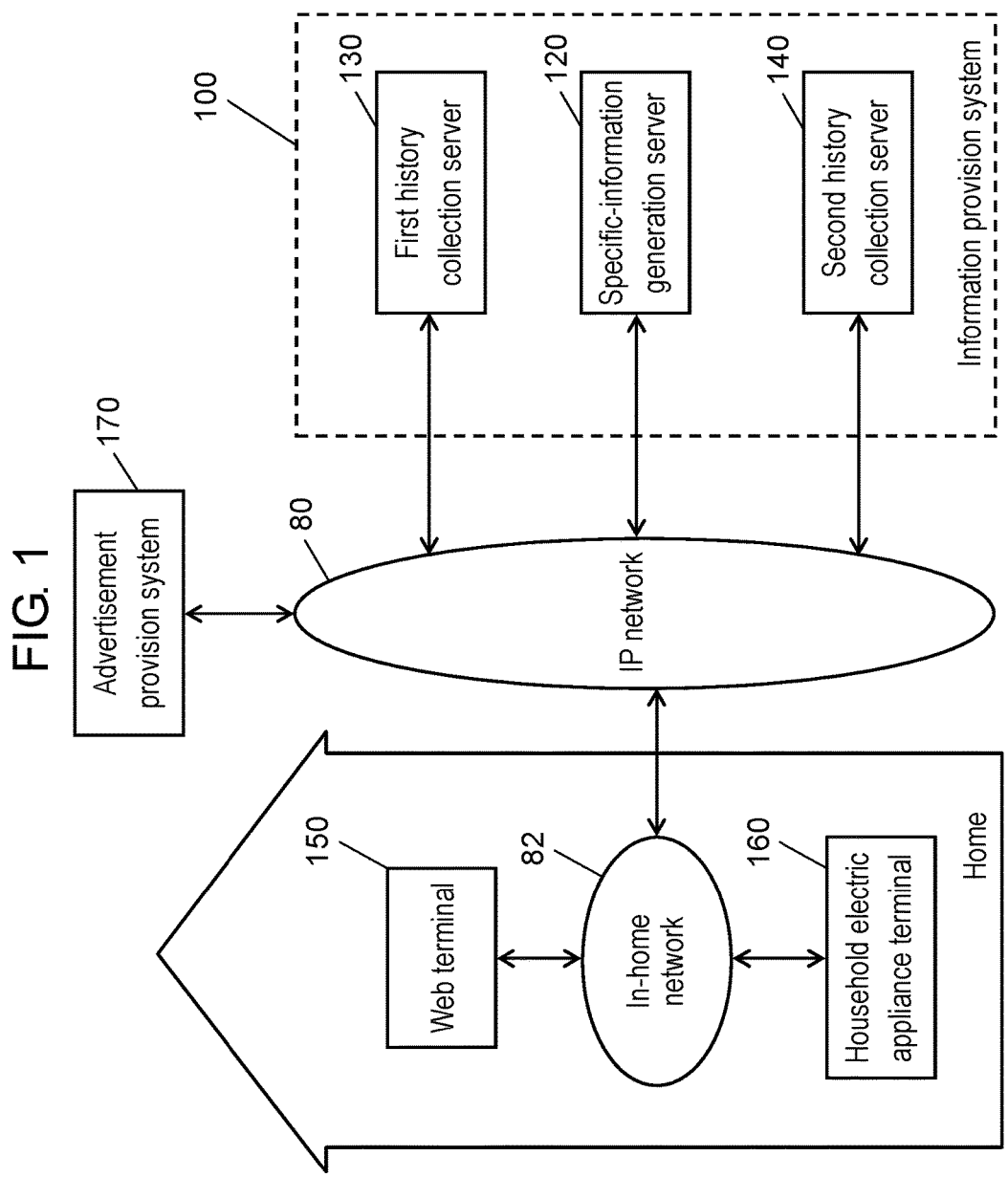
FIG. 1 is a diagram schematically showing one configuration example of an information provision system in a first exemplary embodiment.

Hereinafter, referring to the drawings as needed, exemplary embodiments will be described in detail. However, unnecessarily detailed description may be omitted. For example, detailed description of well-known items and overlapping description of substantially the same configuration may be omitted. This is to avoid unnecessary redundancy of the following description, and to facilitate understanding of those in the art.

The accompanying drawings and the following description are provided for those in the art to sufficiently understand the present disclosure, and are not intended to limit the subject described in the claims.

First Exemplary Embodiment

Hereinafter, referring to FIGS. 1 to 8, a first exemplary embodiment will be described.

[1-1. Configuration of Information Provision System]

FIG. 1 is a diagram schematically showing one configuration example of information provision system 100 in the first exemplary embodiment. Information provision system 100 includes specific-information generation server 120, which is a specific-information generation device, first history collection server 130, which is a first history collection device, and second history collection server 140, which is a second history collection device. These are connected to one another through IP (Internet Protocol) network 80.

Information provision system 100 is related to Web terminal 150, household electric appliance terminal 160, and external advertisement provision system 170. Information provision system 100 is mutually connected to Web terminal 150, household electric appliance terminal 160, and advertisement provision system 170 through IP network 80. Web terminal 150 and household electric appliance terminal 160 configure in-home network 82, and in-home network 82 is connected to IP network 80 through a broadband router not shown. That is, Web terminal 150 and household electric appliance terminal 160 in home are connected to IP network 80 through in-home network 82.

Web terminal 150 is, for example, a personal computer, a tablet computer, a smartphone or the like, and household electric appliance terminal 160 is, for example, a STB (Set Top Box), a television set, a video recording/reproduction machine such as a hard disk recorder, or the like.

[1-2. Operation Sequence of Information Provision System]

Figure 2:
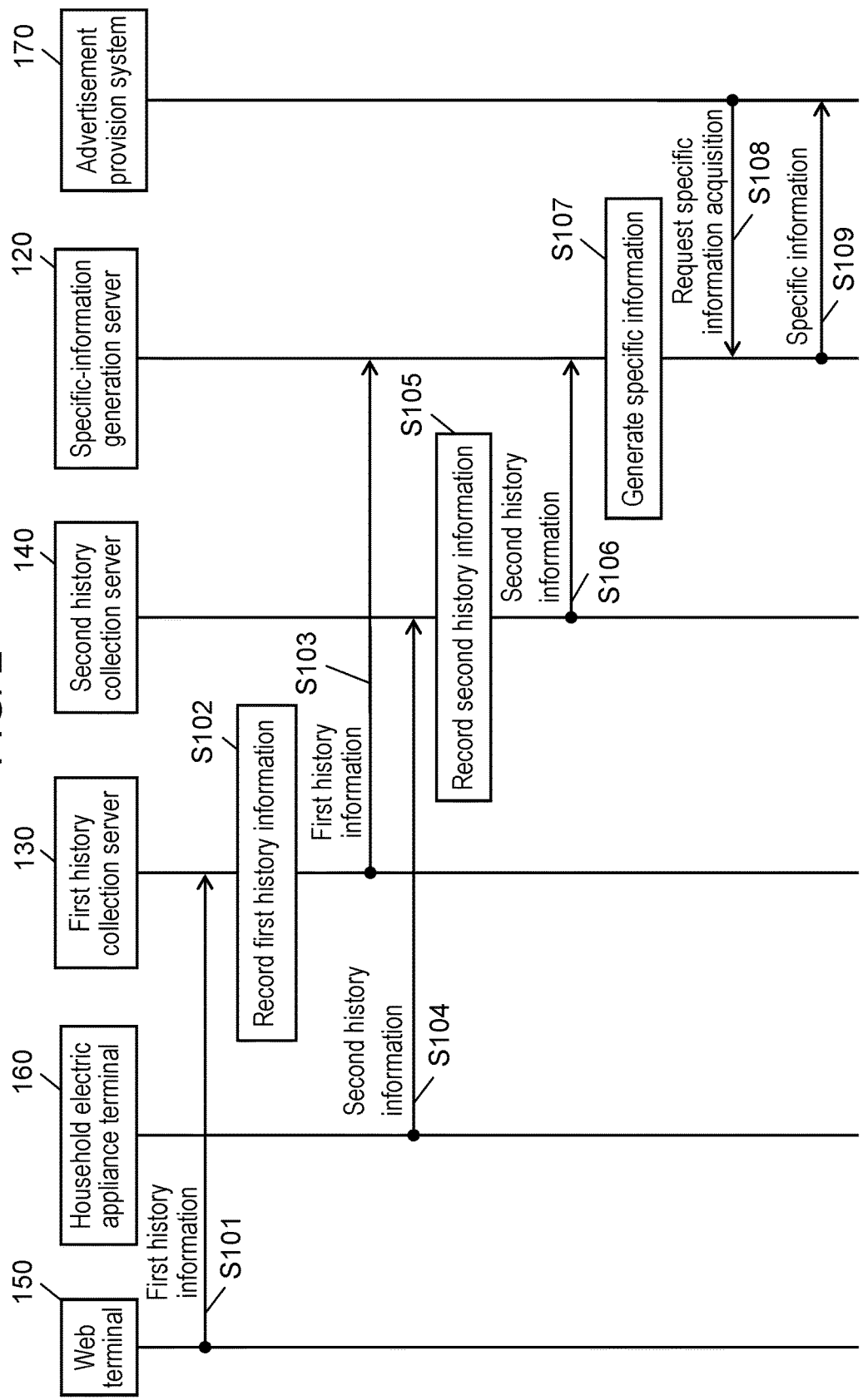
FIG. 2 is a diagram schematically showing one example of an operation sequence of the information provision system in the first exemplary embodiment.

FIG. 2 is a diagram schematically showing one example of an operation sequence of information provision system 100 in the first exemplary embodiment.

FIG. 3 is a diagram schematically showing one example of data accumulated in a database of first history collection server 130 in the first exemplary embodiment.

FIG. 4 is a diagram schematically showing one example of data accumulated in a database of second history collection server 140 in the first exemplary embodiment.

First history collection server 130 collects first history information including information of an access history to the Web from Web terminal 150 through IP network 80 (step S101).

As in one example shown in FIG. 3, first history collection server 130, which has collected the first history information, recodes, on the database of first history collection server 130, an IP address, which is a network identifier of Web terminal 150, date and time information of access of Web terminal 150 to a Web page (an access time), and a keyword indicating characteristics of the Web page accessed by Web terminal 150 (indicated by "KW" in the diagram) (step S102). In this manner, in the present exemplary embodiment, the first history information includes the access history from Web terminal 150 to the Web, and the network identifier (the IP address) of Web terminal 150, and this access history includes the access time to the Web page and the keyword indicating characteristics of the Web page.

First history collection server 130 transmits the first history information (the access history and the network identifier of Web terminal 150) recorded on the database to specific-information generation server 120 through IP network 80 (step S103).

Second history collection server 140 collects second history information including manipulation history information of household electric appliance terminal 160 such as a viewing history and a video recording reservation history from household electric appliance terminal 160 through IP network 80 (step S104).

As in one example shown in FIG. 4, second history collection server 140, which has collected the second history information, records, on the database of second history collection server 140, an IP address, which is a network identifier of household electric appliance terminal 160, a terminal identifier of household electric appliance terminal 160, a use time of household electric appliance terminal 160 (e.g., a time when the user manipulates household electric appliance terminal 160 to view a television program, an air time of a recorded television program or the like), and a keyword group indicating characteristics of the television program viewed or recorded by the user with household electric appliance terminal 160 (step S105). In this manner, in the present exemplary embodiment, the second history information includes a manipulation history of household electric appliance terminal 160 by the user, the network identifier (the IP address) of household electric appliance terminal 160, and the household electric appliance terminal identifier of household electric appliance terminal 160, and this manipulation history includes the use time of household electric appliance terminal 160 and the keyword group. The household electric appliance terminal identifier of household electric appliance terminal 160 is an identifier for discriminating household electric appliance terminal 160 from other household electric appliance terminals, and is, for example, a MAC address (media access control address) or the like.

Second history collection server 140 transmits the second history information (the manipulation history of household electric appliance terminal 160) recorded on the database to specific-information generation server 120 through IP network 80 (step S106).

Specific-information generation server 120, which has acquired the access history of Web terminal 150 to the Web from first history collection server 130, and the manipulation history of household electric appliance terminal 160 from second history collection server 140, generates specific information, based on the acquired history information (including the first history information and the second history information) (step S107). The generated specific information is recorded on history database 202 described later of specific-information generation server 120. In the present exemplary embodiment, this specific information includes attribute information regarding attributes of the user (e.g., a gender, an age bracket, a residential area of the user and so on), and preference information regarding a preference of the user.

Upon receiving a specific-information acquisition request transmitted from external advertisement provision system 170 (step S108), specific-information generation server 120 provides the specific information corresponding to the request to advertisement provision system 170, which is a transmission source of the request (step S109).

Next, a configuration and operation of specific-information generation server 120 will be described.

[1-3. Configuration of Specific-Information Generation Server]

Figure 5:
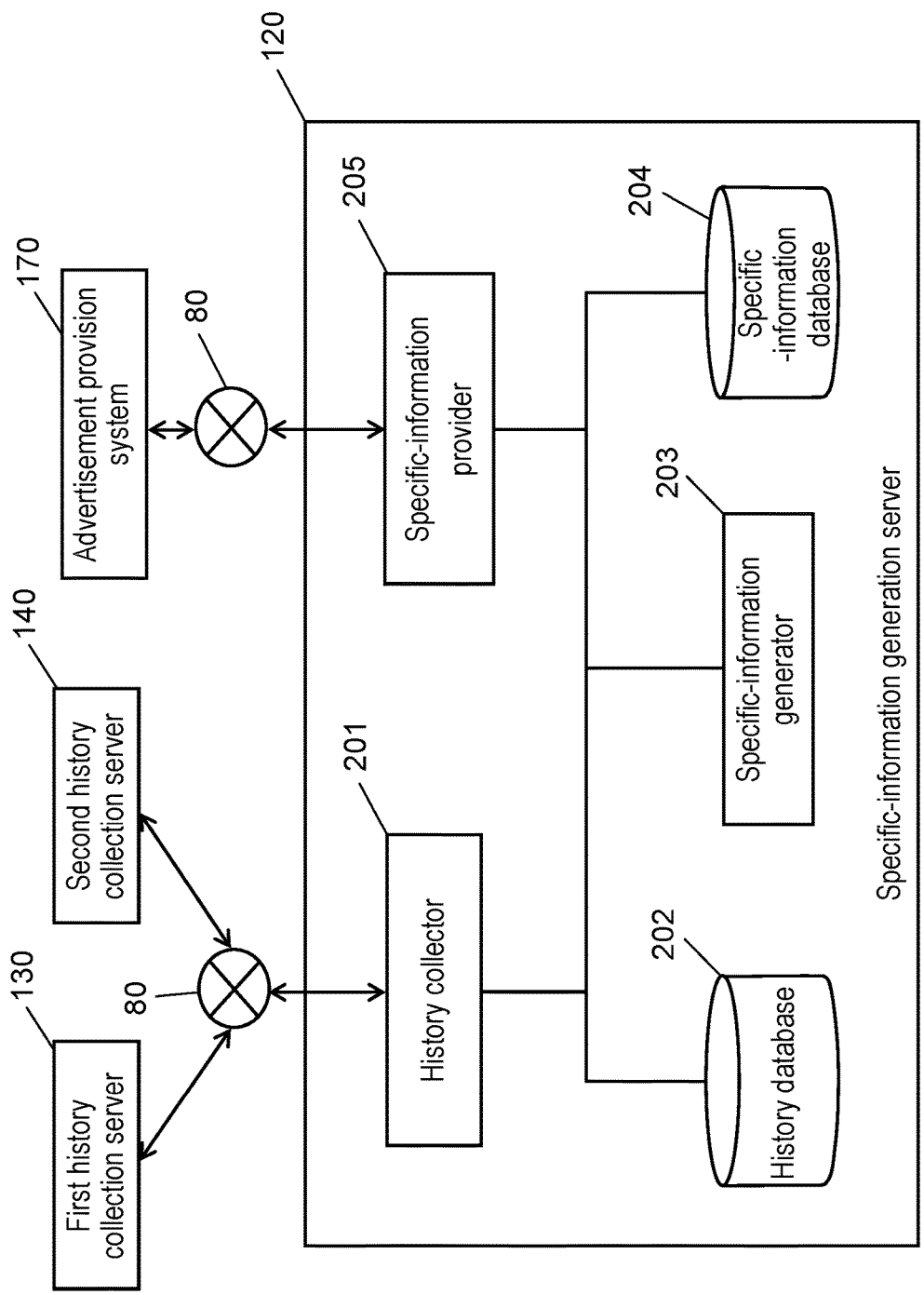
FIG. 5 is a diagram schematically showing one configuration example of a specific-information generation server in the first exemplary embodiment.

FIG. 5 is a diagram schematically showing one configuration example of specific-information generation server 120 in the first exemplary embodiment.

Specific-information generation server 120 includes history collector 201, specific-information generator 203, and specific-information provider 205.

History collector 201 is configured to acquire the first history information from first history collection server 130 and the second history information from second history collection server 140 through IP network 80, and to record the first history information and the second history information on history database 202.

Specific-information generator 203 is configured to generate the specific information, based on the collected first history information and second history information, and to record the generated specific information on specific-information database 204.

Specific-information provider 205 is configured to read the specific information corresponding to the request from specific-information database 204 upon receiving the specific-information acquisition request from advertisement provision system 170 through IP network 80, and to provide the specific information to advertisement provision system 170.

Next, operation of specific-information generator 203 to generate the specific information, based on the acquired first history information and second history information will be described.

[1-4. Operation of Specific-Information Generation Server]

Figure 6:
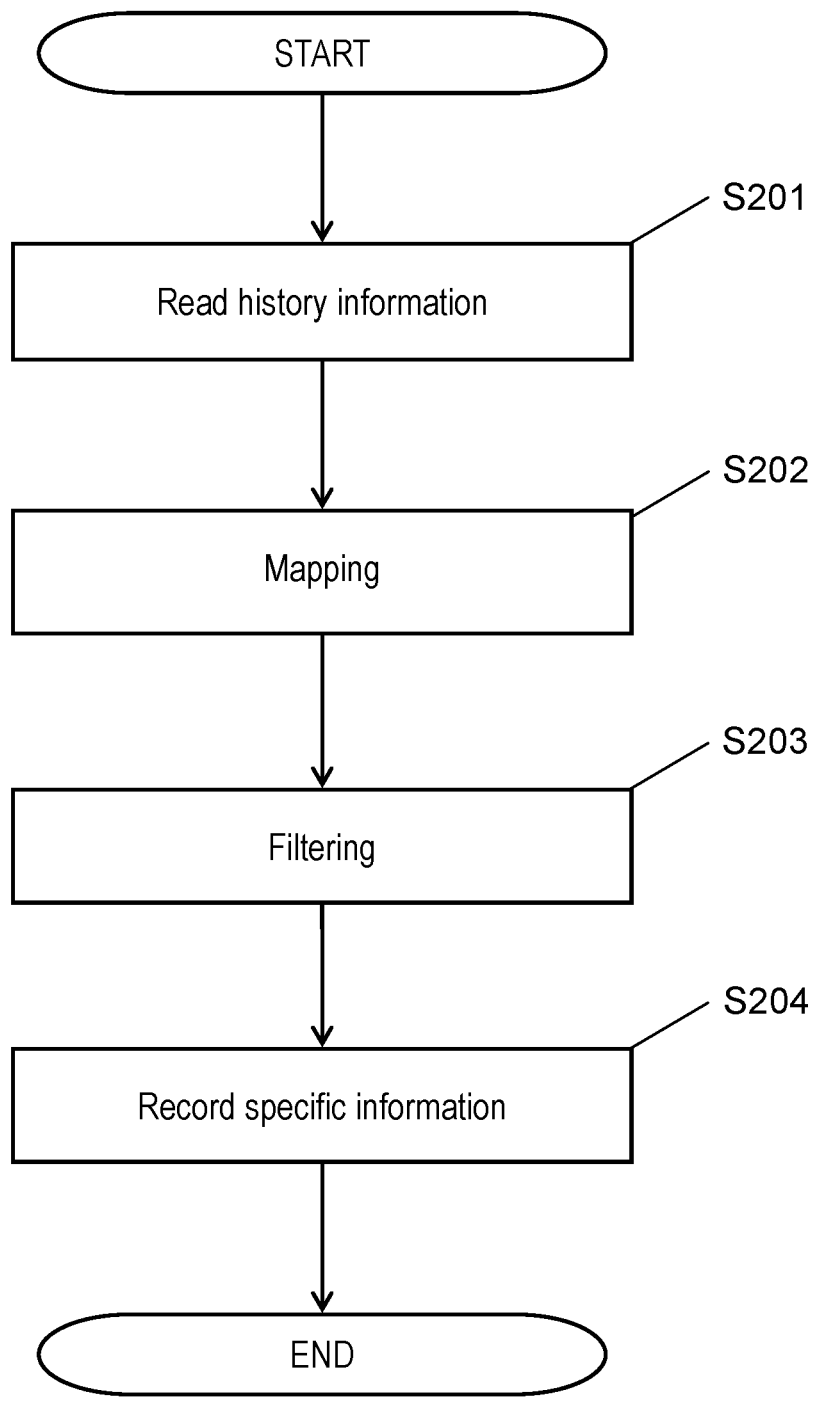
FIG. 6 is a diagram schematically showing one example of a processing flow in a specific-information generator of the specific-information generation server in the first exemplary embodiment.

FIG. 6 is a diagram schematically showing one example of a processing flow in specific-information generator 203 of specific-information generation server 120 in the first exemplary embodiment.

Figure 7:
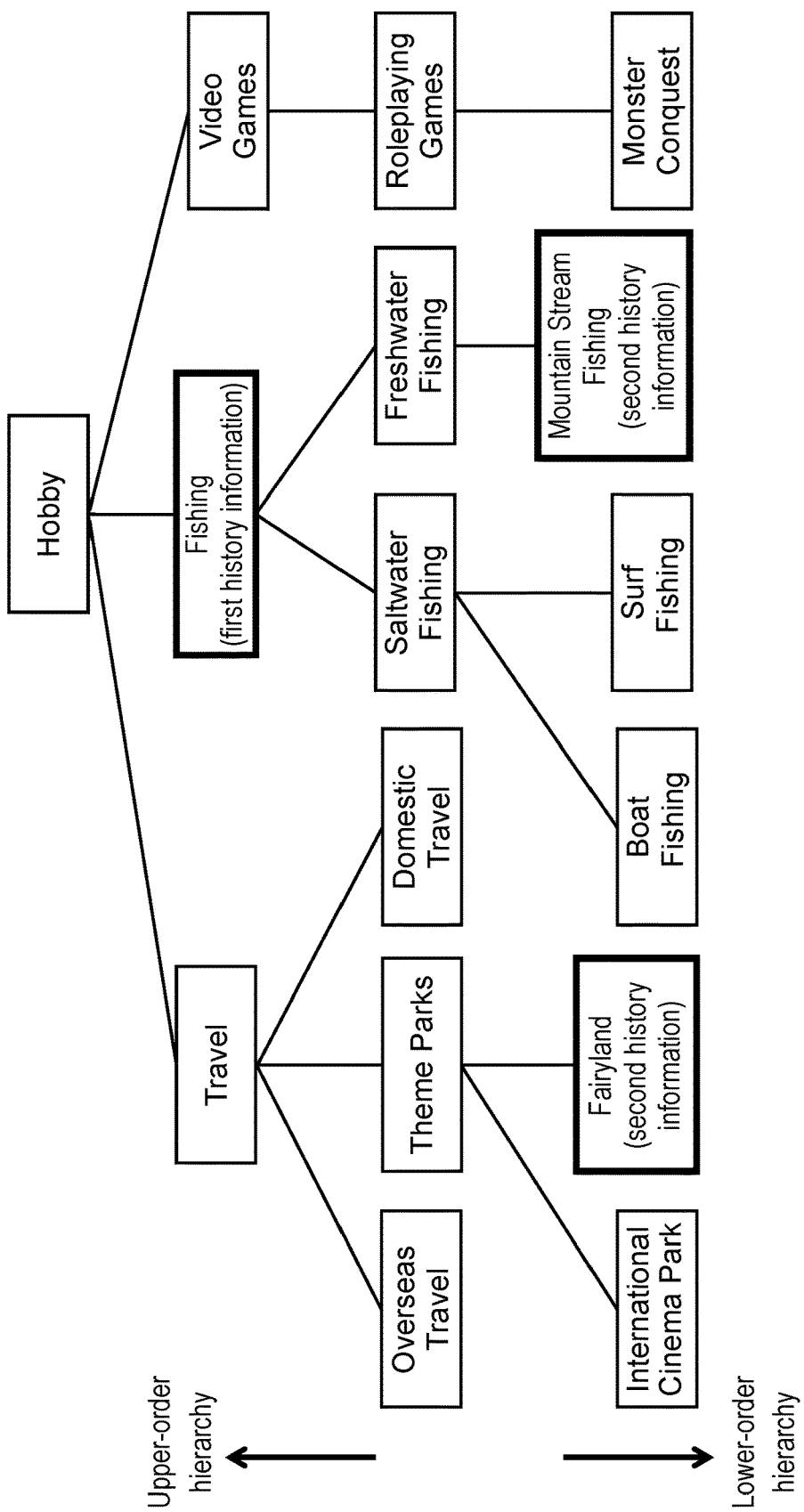
FIG. 7 is a diagram schematically showing one example of a map of a thesaurus for keyword disposition in the first exemplary embodiment.

FIG. 7 is a diagram schematically showing one example of a map of a thesaurus for keyword disposition in the first exemplary embodiment. In this thesaurus, a plurality of keywords are disposed in a hierarchical structure, as shown in FIG. 7, and an upper side of the diagram indicates an upper-order hierarchy, and a lower side of the diagram indicates a lower-order hierarchy. In the upper-order hierarchy, broader terms indicating broader concepts are disposed, and in the lower-order hierarchy, narrower terms indicating narrower concepts are disposed. Keywords having a common concept are connected by a line. For example, "Freshwater Fishing" indicates a broader concept than "Mountain Stream Fishing," which is a narrower term of "Freshwater Fishing," and "Fishing" indicates a broader concept than "Freshwater Fishing," which is a narrower term of "Fishing." Moreover, since "Fishing" is considered to be one of "Hobby," "Fishing" is disposed in a lower-order hierarchy of "Hobby."

FIG. 8 is a diagram schematically showing one example of data generated in specific-information generation server 120 and accumulated in specific-information database 204 in the first exemplary embodiment.

Upon receiving the specific-information acquisition request with the specific IP address specified, which request has been transmitted from advertisement provision system 170, specific-information generator 203 reads, from history database 202, the first history information and the second history information regarding Web terminal 150 having the specific IP address as the network identifier (step S201).

Next, specific-information generator 203 maps the keywords included in the read first history information and second history information in a map of the thesaurus prepared in advance shown in FIG. 7 (step S202). This map of the thesaurus has a structure in which the keywords are disposed so as to form the hierarchical structure, based on meanings of the respective keywords, and the keywords of a synonym group are associated in a "relation between the broader term and the narrower term," as described above. FIG. 7 shows an example in which the keyword "Fishing" included in the first history information, and two keywords "Mountain Stream Fishing" and "Fairy Land" included in the second history information are disposed in the map of the thesaurus.

Next, specific-information generator 203 filters (excludes) the keyword of the second history information that is not in the "relation between the broader term and the narrower term" with the keyword included in the first history information on the disposition in the map of the thesaurus. Moreover, specific-information generator 203 filters (excludes) the keyword of the second history information apart at a distance larger than or equal to a predetermined distance from the keyword included in the first history information (step S203). While the predetermined distance is, for example, "4," the predetermined distance is preferably set properly in accordance with a specification and the like of specific-information generation server 120, and the predetermined distance is not limited to "4."

In this manner, specific-information generator 203 selects a single or a plurality of keywords. For example, in the example shown in FIG. 7, the keyword "Mountain Stream Fishing" of the second history information is not filtered, because it is located as the narrower term of the keyword "Fishing" of the first history information. On the other hand, the keyword "Fairyland" of the second history information is filtered because the keyword of the first history information does not exist in the broader term(s) and the narrower term(s) of the keyword "Fairyland." Accordingly, in the example shown in FIG. 7, the keyword "Mountain Stream Fishing," which is left without being filtered, is selected as the keyword corresponding to the keyword "Fishing."

The distance between the keywords mapped in the map of the thesaurus is calculated by the number of hierarchies between the keywords. For example, the distance between the keyword "Fishing" of the first history information and the keyword "Mountain Stream Fishing" of the second history information in FIG. 7 is "2." This is because between the two keywords, there exist two hierarchies; one hierarchy of the keyword "Fishing" to the keyword "Freshwater Fishing," and one hierarchy of the keyword "Freshwater Fishing" to the keyword "Mountain Stream Fishing." Moreover, the distance between the keyword "Fishing" of the first history information and the keyword "Fairyland" of the second history information is "4." This is because between the two keywords, there exist four hierarchies; one hierarchy of the keyword "Fishing" to the keyword "Hobby," one hierarchy of the keyword "Hobby" to the keyword "Travel," one hierarchy of the keyword "Travel" to the keyword "Theme Parks," and one hierarchy of the keyword "Theme Parks" to the keyword "Fairyland."

In this manner, in step S203, the keyword of the second history information that is not in the "relation between the broader term and the narrower term" with the keyword included in the first history information, and the keyword of the second history information apart at a distance larger than or equal to the predetermined distance from the keyword of the first history information are filtered (excluded).

This is because there is a possibility that the household electric appliance manipulation that is a source of generation of the above-described keywords is performed by a different user from the user who has accessed the Web page through Web terminal 150. For example, suppose that a female user manipulates Web terminal 150 to access a Web page regarding shopping or fashion, by which a keyword related to shopping or fashion is included in the first history information. At this time, if a keyword regarding a children's program is included in the second history information, there is a possibility that the household electric appliance manipulation that is a generation source of this second history information is performed by a child user. For such a reason, the keywords of the second history information as described above are filtered (excluded) in step S203.

Next, specific-information generator 203 associates a keyword group (hereinafter, also referred to as a "history keyword group") left without being filtered (excluded) in step S203 with predetermined attribute data and preference data. Specific-information generator 203 records the attribute data and the preference data corresponding to the history keyword group as the specific information (the attribute information and the preference information) of a predetermined network identifier on specific-information database 204 (step S204). This predetermined network identifier is a network identifier of a specific information collection object.

The attribute information is, for example, a gender, an age bracket, a regional name, and the like. A single or a plurality of pieces of attribute data selected from a plurality of pieces of attribute data set in advance, based on the history keyword group, are the attribute information. In FIG. 8, as one example of the attribute information, information regarding the gender and the age bracket is shown. The preference information is the history keyword group itself. Alternatively, the keyword(s) as the broader term(s) on the map of the thesaurus is (are) selected as the preference information with respect to each history keyword group.

Specific-information generator 203 carries out the processing in steps S201 to S205 in FIG. 6 for all the network identifiers included in the first history information and the second history information. This allows the specific information of Web terminal 150 corresponding to each of the network identifiers to be recorded on specific-information database 204, as shown in one example in FIG. 8.

[1-5. Effects and the Like]

As described above, in the present exemplary embodiment, information provision system 100 includes first history collection server 130, which is the first history collection device, second history collection server 140, which is the second history collection device, and specific-information generation server 120, which is the specific-information generation device. In this information provision system 100, the first history collection device is configured to acquire the access history of Web terminal 150 and the network identifier of Web terminal 150 from Web terminal 150 and to provide the same to the specific-information generation device. The second history collection device is configured to acquire the manipulation history of household electric appliance terminal 160, the household electric appliance terminal identifier to discriminate household electric appliance terminal 160 from other household electric appliance terminals, and the network identifier of household electric appliance terminal 160 from household electric appliance terminal 160 and to provide the same to the specific-information generation device. The specific-information generation device includes history collector 201, specific-information generator 203, and specific-information provider 205. History collector 201 is configured to acquire the first history information from the first history collection device, and to acquire the second history information from the second history collection device. The first history information includes the access history of Web terminal 150 and the network identifier of Web terminal 150. The second history information includes the manipulation history of household electric appliance terminal 160, the household electric appliance terminal identifier of household electric appliance terminal 160, and the network identifier of household electric appliance terminal 160. Specific-information generator 203 is configured to generate the specific information regarding the attribute and the preference of the user, based on the first history information and the second history information acquired in history collector 201. Specific-information provider 205 is configured to provide the specific information to the transmission source of the request in response to the request transmitted from outside.

Moreover, specific-information generator 203 is configured to dispose the keywords obtained from the access history of Web terminal 150, and the keywords obtained from the manipulation history of household electric appliance terminal 160 in the map of the thesaurus prepared in advance. Specific-information generator 203 is further configured to select a single or a plurality of the keywords, based on the disposition positions of the respective keywords disposed on the map of the thesaurus and to generate the specific information, based on the selected keywords.

Generally, Web terminal 150 such as a personal computer, a smartphone, or a tablet computer is personally used by the user himself or herself. However, household electric appliance terminal 160 such as a STB or a television may be manipulated by not only the user himself or herself but also a family of the user living with the user, a friend of the user who visits the user, and the like. In the above-described cases, the manipulation history of household electric appliance terminal 160 such as a viewing history and a recording history includes not only the manipulation history of the user himself or herself but also the manipulation history of the family and the friend of the user, and the like.

In the conventional technique disclosed in Patent Literature 2 or the like, since it is not assumed that one piece of equipment is used by a plurality of persons, it is difficult to specify the attribute information and the preference information of the user, based on the manipulation history of household electric appliance terminal 160.

However, in the present exemplary embodiment, with the above-described configuration, even when household electric appliance terminal 160 such as the STB or the television or the like is used not only by the user who manipulates Web terminal 150 but also by users other than the relevant user, the attribute information and the preference information of the relevant user can be generated with increased accuracy, based on the first history information and the second history information. The information generated with high accuracy can be provided to external advertisement provision system 170 and the like.

Second Exemplary Embodiment

Hereinafter, referring to FIGS. 9, 10A and 10B, a second exemplary embodiment will be described.

An information provision system in the second exemplary embodiment has substantially the same configuration and operation as those of information provision system 100 described in the first exemplary embodiment.

However, the second exemplary embodiment is different from the first exemplary embodiment in operation of specific-information generation server 120 as a specific-information generation device. Hereinafter, the differences will be described.

[2-1. Operation of Specific-Information Generation Server]

Figure 9:
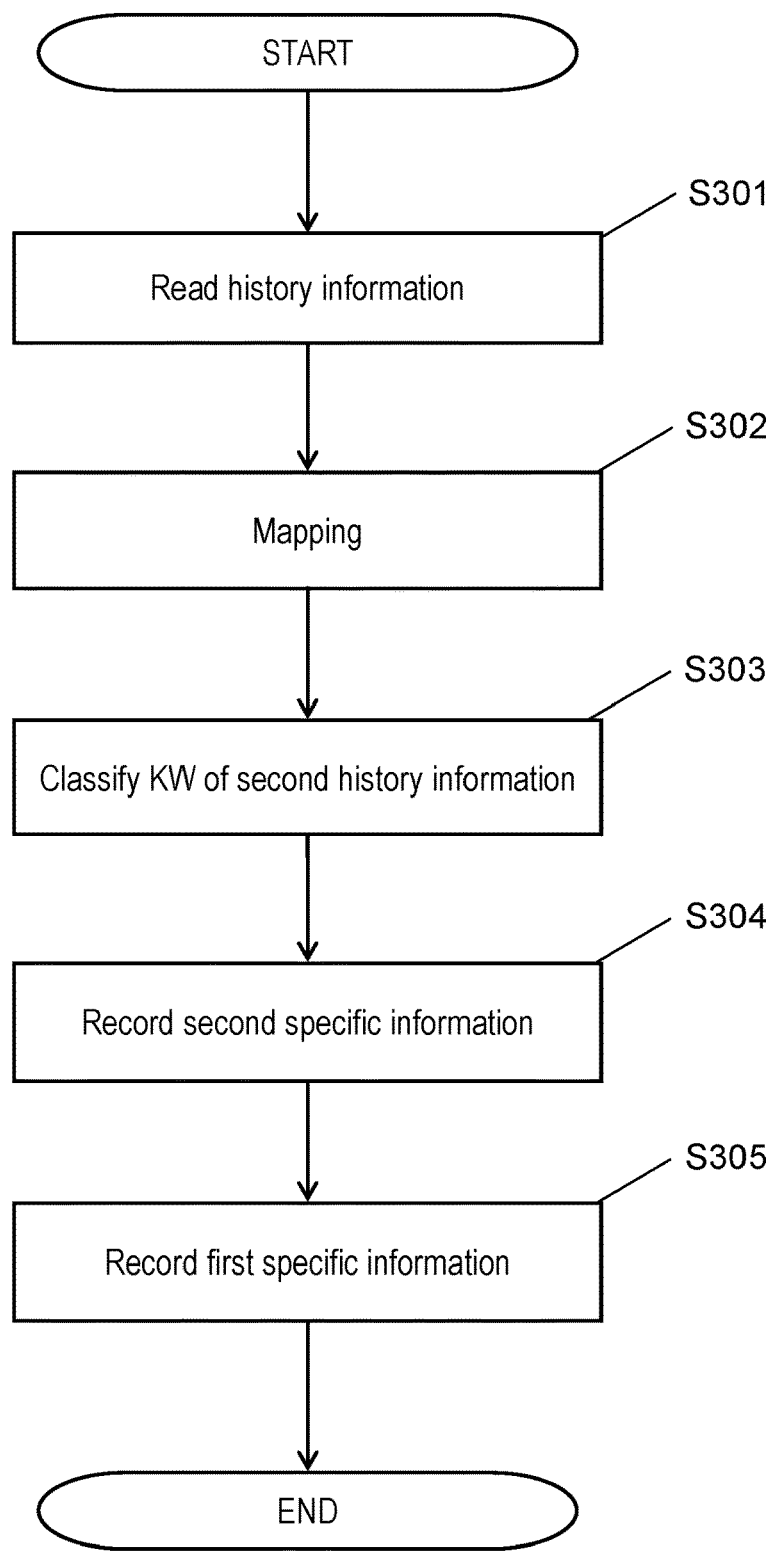
FIG. 9 is a diagram schematically showing one example of a processing flow in a specific-information generator of a specific-information generation server in a second exemplary embodiment.

FIG. 9 is a diagram schematically showing one example of a processing flow in specific-information generator 203 of a specific-information generation server in the second exemplary embodiment.

FIG. 10A is a diagram schematically showing one example of first specific information generated in specific-information generation server 120 and accumulated in specific-information database 204 in the second exemplary embodiment. FIG. 10B is a diagram schematically showing one example of second specific information generated in specific-information generation server 120 and accumulated in specific-information database 204 in the second exemplary embodiment.

Upon receiving a specific-information acquisition request with a specific IP address specified, which request has been transmitted from advertisement provision system 170, specific-information generator 203 reads, from history database 202, first history information and second history information regarding Web terminal 150 having the specific IP address as a network identifier (step S301).

Next, specific-information generator 203 maps the keywords included in each history information of the read first history information and second history information in a map of a thesaurus prepared in advance (step S302). This map of the thesaurus is substantially similar to the map of thesaurus shown in FIG. 7 in the first exemplary embodiment.

Next, specific-information generator 203 classifies the keywords of the second history information into two, based on distances from the keyword included in the first history information (distances on the map of the thesaurus) (step S303). Specifically, specific-information generator 203 classifies the keywords of the second history information into the keyword(s) of the second history information having a distance (the distance on the map of the thesaurus) smaller than a predetermined distance from the keyword included in the first history information (the keyword determined to have a small distance), and the keyword(s) of the second history information having a distance larger than or equal to the predetermined distance (the keyword determined to have a large distance). This "distance" is synonymous with the "distance" described in the first exemplary embodiment. While the predetermined distance is, for example, "4," the predetermined distance is preferably set properly in accordance with a specification or the like of specific-information generation server 120, and the predetermined distance is not limited to "4."

Next, specific-information generator 203 associates the keyword of the second history information that is not in a "relation between a broader term and a narrower term" with the keyword included in the first history information, and the keyword of the second history information that is determined to have the large distance in step S303 on the disposition in the map of the thesaurus with predetermined attribute data and preference data. Specific-information generator 203 records the corresponding attribute data and preference data on specific-information database 204 as the second specific information (the latent attribute information and preference information) of the predetermined network identifier (step S304). For example, in the example shown in FIGS. 4 and 7, the keyword "Fairyland" included in the second history information is the second specific information. This second specific information is the latent attribute information and preference information with respect to the predetermined network identifier. The meaning of "latent" will be described later.

The attribute information is, for example, presence or absence of a family/a friend, a gender/an age bracket of the family/the friend, and the like. A single or a plurality of pieces of attribute data selected from a plurality of pieces of attribute data set in advance, based on the keywords of the second history information are the attribute information. The preference information is a keyword group of the second history information itself. Alternatively, the keyword(s) as the broader term(s) on the map of the thesaurus is (are) selected as the preference information with respect to each keyword group of the second history information.

Generally, people tend to be strongly affected by people in close relationships such as their families and friends in behaviors in their daily lives. For example, in some cases, the user is interested in a program that his or her family watches, and the user himself or herself comes to watch the same program. Alternatively, in other cases, the user is interested in a hobby of his or her friend, and the user himself or herself comes to have the same hobby as that of his or her friend.

In the first exemplary embodiment, the keyword of the first history information, the keyword of the second history information that is not in the "relation between the broader term and the narrower term" on the disposition on the map of the thesaurus, and the keyword of the second history information that is determined to have the large distance on the map of the thesaurus are filtered (excluded), because the household electric appliance manipulation including those keywords is considered to have been performed by a different user from the user who has accessed the Web page using Web terminal 150.

In the present exemplary embodiment, the above-described second history information is treated as information based on behaviors of people who manipulate the same household electric appliance terminal as the household electric appliance terminal used by the user, that is, people in close relationships with the user in daily lives. There is a possibility that the user who manipulates Web terminal 150 is affected by the behaviors of the people in close relationships with the user. For this reason, the information filtered (excluded) in the first exemplary embodiment is defined as the latent attribute information and preference information, and the latent attribute information and preference information are used as the second specific information.

Next, specific-information generator 203 associates a keyword group (a history keyword group) left because it is not determined to be the second specific information in step S304, and the keyword of the second history information that is determined to have the small distance in step S303 with predetermined attribute data and preference data. This history keyword group is made up of the keywords of the second history information in the "relation between the broader term and the narrower term" with the keyword included in the first history information on the disposition in the map of the thesaurus. Specific-information generator 203 records the attribute data and preference data corresponding to these keywords on specific-information database 204 as the first specific information (the overt attribute information and preference information) of the predetermined network identifier (step S305). This first specific information is positioned substantially similarly to the specific information in the first exemplary embodiment.

The attribute information is, for example, a gender, an age bracket, a regional name, and the like. A single or a plurality of pieces of attribute data selected from a plurality of pieces of attribute data set in advance, based on the history keyword group, are the attribute information. In FIGS. 10A and 10B, as one example of the attribute information, information regarding the gender and the age bracket is shown. The preference information is the history keyword group itself. Alternatively, the keyword(s) as the broader term(s) on the map of the thesaurus is (are) selected as the preference information with respect to each history keyword group.

The history information used in step S305 is considered to be use history information of Web terminal 150 by the user who has accessed the Web page through Web terminal 150. Thus, the first specific information based on this history information is the overt attribute information and preference information in contrast to the second specific information, which is the latent attribute information and preference information generated in step S304.

Specific-information generator 203 carries out the processing in steps S301 to S305 in FIG. 9 for all the network identifiers included in the first history information and the second history information. This allows the first specific information and the second specific information of Web terminal 150 corresponding to each of the network identifiers to be recorded on specific-information database 204, as shown in FIGS. 10A and 10B.

[2-2. Effects and the Like]

As described above, in the present exemplary embodiment, the specific-information generator of the specific-information generation device is configured to determine whether the distance between the keywords is small or large, based on the disposed positions of the respective keywords disposed on the map of the thesaurus. Further, the configuration is such that the first specific information is generated, based on the keywords obtained from the access history of the Web terminal, and the keywords obtained from the manipulation history of the household electric appliance terminal, which keywords are determined to have the small distances from the keywords obtained from the access history of the Web terminal, and that the second specific information is generated, based on the keywords obtained from the manipulation history of the household electric appliance terminal, which keywords are determined to have the large distances from the keywords obtained from the access history of the Web terminal.

Thereby, even when household electric appliance terminal 160 such as a STB or a television or the like is used not only by the user who manipulates Web terminal 150 but also by users other than the relevant user, the overt attribute information and preference information of the relevant user can be generated with increased accuracy, based on the first history information and the second history information, and the latent attribute information and preference information of the relevant user can be generated to be provided to external advertisement provision system 170 and the like.

Third Exemplary Embodiment

Hereinafter, referring to FIGS. 11 to 14, a third exemplary embodiment will be described.

An information provision system in the third exemplary embodiment has substantially the same configuration and operation as those of information provision system 100 described in the first exemplary embodiment.

However, the third exemplary embodiment is different from the first exemplary embodiment in operation of an information provision system and specific-information generation server 120 as a specific-information generation device. Hereinafter, the differences will be described.

[3-1. Configuration of System]

Figure 11:
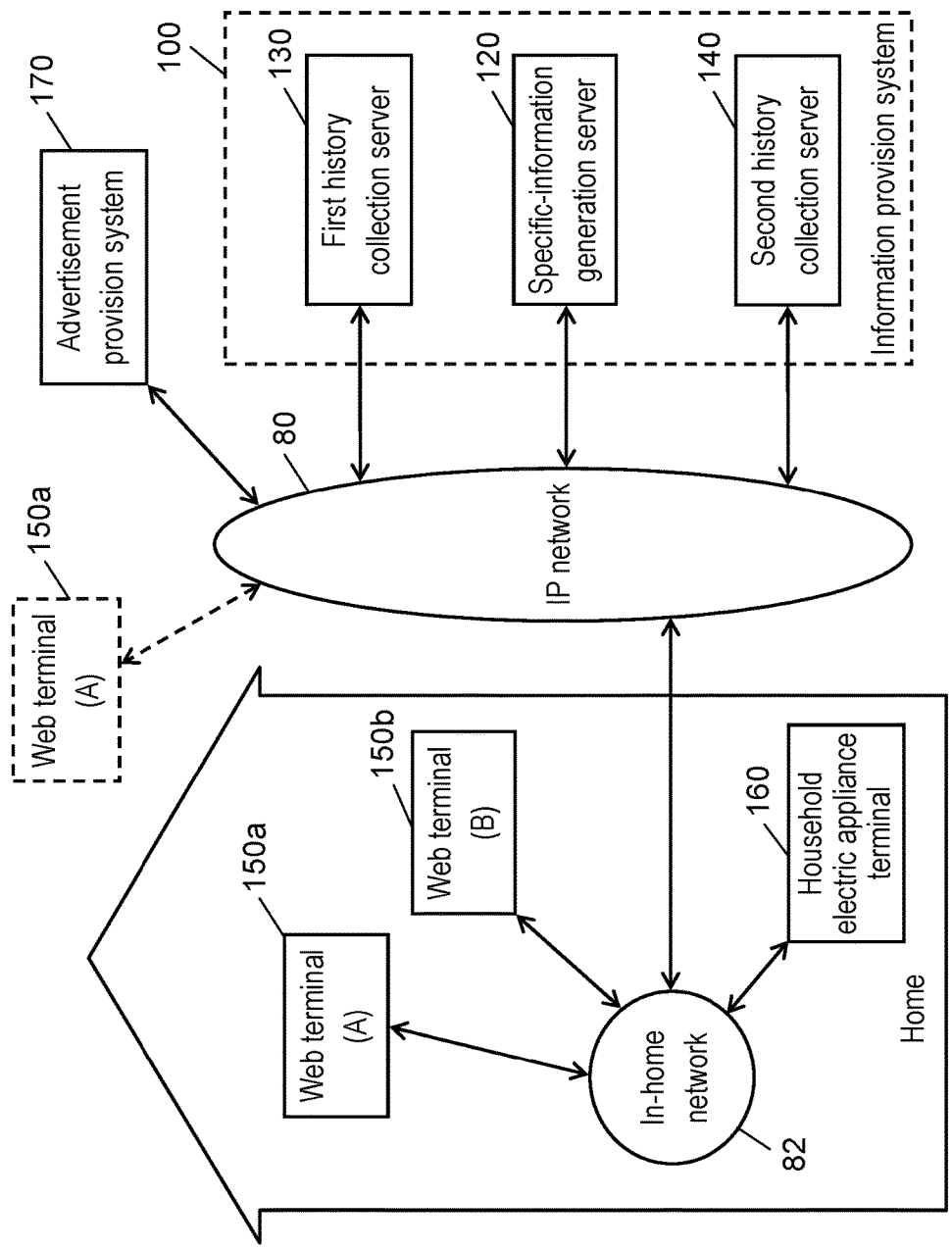
FIG. 11 is a diagram schematically showing one configuration example of an information provision system in a third exemplary embodiment.

FIG. 11 is a diagram schematically showing one configuration example of the information provision system in the third exemplary embodiment.

FIG. 12 is a diagram schematically showing one example of data accumulated in a database of first history collection server 130 in the third exemplary embodiment.

In the third exemplary embodiment, there exist a plurality of Web terminals 150 (e.g., Web terminals 150a, 150b) in home, as shown in FIG. 11, and respective Web terminals 150 are used by different users. In FIG. 11, Web terminal 150a is indicated by Web terminal (A), and Web terminal 150b is indicated by Web terminal (B). There are cases where Web terminal 150a is connected from in-home network 82 to IP network 80, and where it is connected from an outside of home to IP network 80.

First history collection server 130 in the third exemplary embodiment collects first history information including information of an access history to the Web from each of Web terminal 150a and Web terminal 150b. First history collection server 130 issues and gives a Web terminal identifier for distinguishing respective Web terminals 150a, 150b from each other to each of Web terminal 150a and Web terminal 150b. This Web terminal identifier is, for example, a cookie.

Each of Web terminal 150a and Web terminal 150b transmits the cookie issued from first history collection server 130 when communicating with first history collection server 130 (when performing the operation corresponding to step S101 in FIG. 2). Thereby, as shown in FIG. 12, on first history collection server 130 are recorded IP addresses, which are network identifiers of respective Web terminals 150a, 150b, the cookies, which are the Web terminal identifiers of respective Web terminals 150a, 150b, time and date information (access time) of access of respective Web terminals 150a, 150b to Web pages, and keywords indicating characteristics of the Web pages accessed by respective Web terminals 150a, 150b. In this manner, in the present exemplary embodiment, the first history information includes the access history from Web terminals 150 to the Web, the network identifiers (the IP addresses) of Web terminals 150, and Web terminal identifiers (cookies) of Web terminals 150, and this access history includes the access time to the Web pages and the keywords indicating the characteristics of the Web pages.

First history collection server 130 transmits the first history information (the access history to the Web, the network identifier, and the Web terminal identifier of each of Web terminals 150a, 150b) recorded on the database to specific-information generation server 120.

[3-2. Operation of Specific-Information Generation Server]

Figure 13:
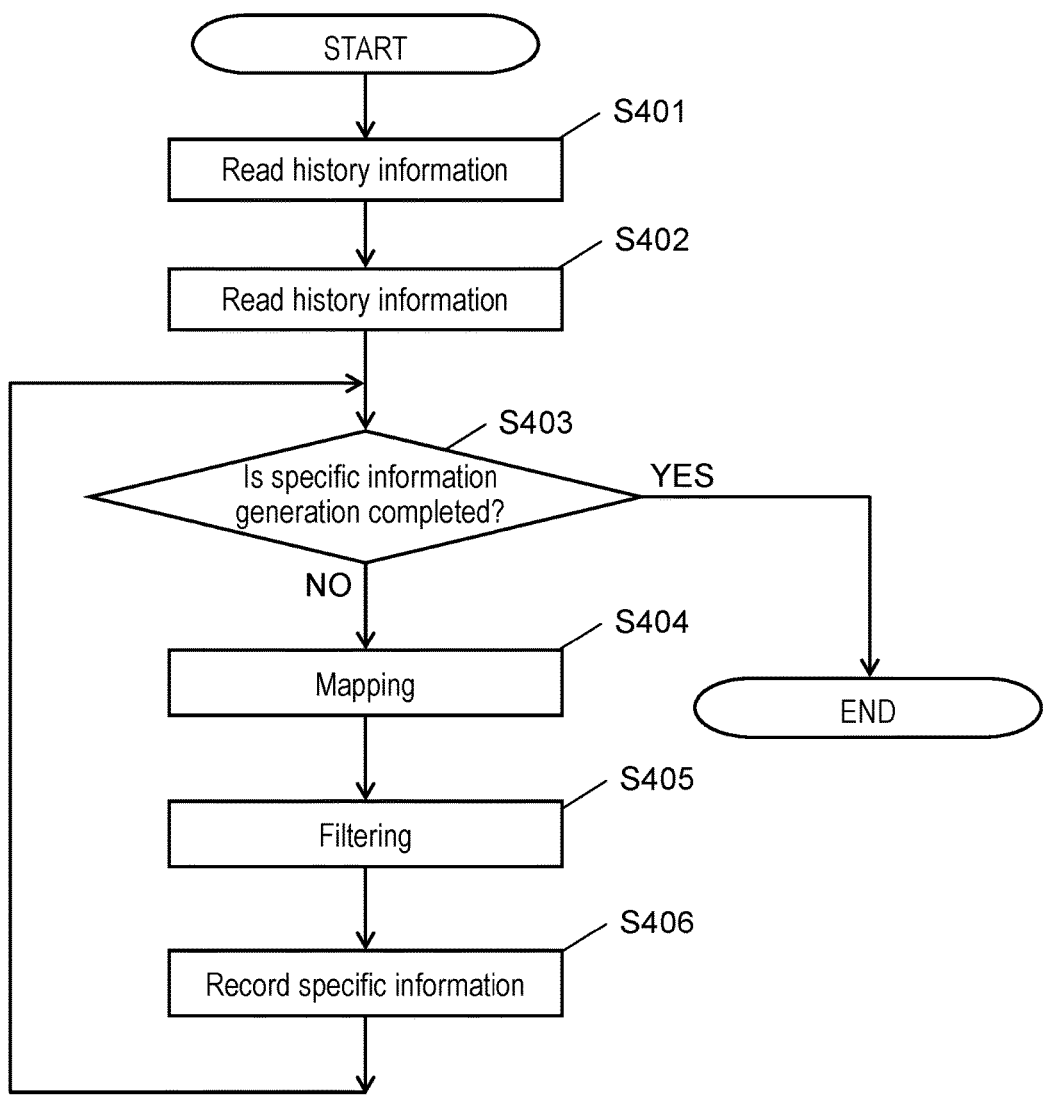
FIG. 13 is a diagram schematically showing one example of a processing flow in a specific-information generator of a specific-information generation server in the third exemplary embodiment.

FIG. 13 is a diagram schematically showing one example of a processing flow in specific-information generator 203 of specific-information generation server 120 in the third exemplary embodiment.

FIG. 14 is a diagram schematically showing one example of data generated in specific-information generation server 120 and accumulated in specific-information database 204 in the third exemplary embodiment.

Upon receiving a specific-information acquisition request with a specific IP address specified, which request has been transmitted from advertisement provision system 170, specific-information generator 203 reads, from history database 202, the first history information and the second history information regarding Web terminal 150 having the specific IP address as the network identifier (step S401).

Next, specific-information generator 203 reads, from history database 202, the first history information of Web terminal 150 having the same Web terminal identifier as the Web terminal identifier included in the read first history information (step S402). For example, in the example shown in FIG. 12, the Web terminal identifier corresponding to the IP address "AA:BB:CC:DD" is "12345678." Accordingly, specific-information generator 203 reads, from history database 202, the first history information corresponding to the IP address "JJ:KK:LL:MM" of the same Web terminal identifier "12345678" as the relevant Web terminal identifier.

Generally, between the case where Web terminal 150 accesses IP network 80 from in-home network 82, and the case where Web terminal 150 accesses IP network 80 from the outside of home, the IP address as the network identifier of Web terminal 150 differs. Thus, if specific-information generator 203 is configured to generate the specific information, using only the network identifier, for example, it is difficult to use the first history information of a case where Web terminal 150a is connected to in-home network 82, and the first history information of a case where Web terminal 150a is used outside home in association with each other.

In the present exemplary embodiment, specific-information generator 203 uses the Web terminal identifier when generating the specific information. Thereby, when generating the specific information, specific-information generator 203 can use the first history information of a case where Web terminal 150 accesses IP network 80 from in-home network 82, and the first history information of a case where Web terminal 150 accesses IP network 80 from the outside of home in association with each other.

Specific-information generator 203 determines whether or not the generation of the specific information has been completed for all the network identifiers (step S403). The following series of processing is performed until the generation of the specific information is completed for all the network identifiers (No in step S403).

When a plurality of Web terminals 150 are connected to in-home network 82, they may use one IP address in common. For example, each of Web terminal 150a and Web terminal 150b connected to in-home network 82 may use the IP address "AA:BB:CC:DD" in common. However, even in the above-described case, the Web terminal identifiers different from one another are given to each of a plurality of Web terminals 150. For example, in the example shown in FIG. 12, with respect to the IP address "AA:BB:CC:DD," the Web terminal identifier "12345678" and the Web terminal identifier "78694587" are given.

Accordingly, if the first history information of one network identifier includes a plurality of Web terminal identifiers, specific-information generator 203 performs the following series of processing for the first history information of each of the Web terminal identifiers. This enables specific-information generator 203 to generate the specific information of each of Web terminals 150, even when a plurality of Web terminals 150 (e.g., Web terminal 150*a*, Web terminal 150*b*) respectively used by a plurality of users exist in in-home network 82.

Next, specific-information generator 203 maps the keywords included in each history information of the read first history information and second history information in a map of a thesaurus prepared in advance (step S404). This map of the thesaurus is substantially similar to the map of the thesaurus shown in FIG. 7 of the first exemplary embodiment.

Next, specific-information generator 203 filters (excludes) the keyword of the second history information that is not in a "relation between a broader term and a narrower term" with the keyword included in the first history information on disposition in the map of the thesaurus. Moreover, specific-information generator 203 filters (excludes) the keyword of the second history information apart at a distance larger than or equal to a predetermined distance from the keyword included in the first history information (step S405). In this manner, specific-information generator 203 selects a single or a plurality of keywords. This "distance" is synonymous with the "distance" described in the first exemplary embodiment, and a method for the filtering is substantially similar to the filtering described in the first exemplary embodiment. Moreover, while the predetermined distance is, for example, "4," the predetermined distance is preferably set properly in accordance with a specification and the like of specific-information generation server 120, and the predetermined distance is not limited to "4."

Next, specific-information generator 203 associates a keyword group (a "history keyword group") left without being filtered (excluded) in step S405 with predetermined attribute data and preference data. Specific-information generator 203 records the attribute data and the preference data corresponding to the history keyword group as the specific information (the attribute information and the preference information) of the predetermined network identifier and the Web terminal identifier on specific-information database 204 (step S406). The association between this history keyword group, and the attribute data and the preference data is performed by a method substantially similar to the method described in the first exemplary embodiment. The predetermined network identifier and Web terminal identifier are a network identifier and a Web terminal identifier of a specific information collection object.

Specific-information generator 203 carries out the processing in steps S401 to S406 in FIG. 13 for all the network identifiers included in the first history information and the second history information. This allows the specific information corresponding to each of the network identifiers and each of the Web terminal identifiers of Web terminals 150 to be recorded on specific-information database 204, as shown in FIG. 14. In the example shown in FIG. 14, while Web terminals 150 with the network identifier (the IP address) "AA:BB:CC:DD" and Web terminal 150 with "JJ:KK:LL: MM" are different in the network identifier, they have the same Web terminal identifier (the cookie) "12345678," and can be thus treated as one Web terminal 150. Moreover, while Web terminal 150 given the Web terminal identifier (the cookie) "12345678" and Web terminal 150 given "78694587" have the common network identifier (the IP address) "AA:BB:CC:DD," the Web terminal identifiers are different from each other, so that the above-described Web terminals 150 can be treated as different Web terminals 150.

[3-2. Effects and the Like]

As described above, in the present exemplary embodiment, the first history collection device is configured to further acquire, from the Web terminal, the Web terminal identifier to discriminate the Web terminal from other Web terminals and to provide the same to the specific-information generation device. The history collector of the specific-information generation device is configured to further acquire the Web terminal identifier from the first history collection device. The specific-information generator of the specific-information generation device is configured to dispose the keywords obtained from the access history of a single or a plurality of the Web terminals selected based on the Web terminal identifier, and the keywords obtained from the manipulation history of the household electric appliance terminal in the map of the thesaurus prepared in advance. The configuration is further such that a single or a plurality of keywords are selected based on disposed positions of the respective keywords disposed on the map of the thesaurus, and that the specific information is generated, based on the selected keywords.

Thereby, in the case where a plurality of Web terminals 150 respectively used by a plurality of users exist in home, or in the case where one Web terminal 150 is used in home and outside home, even if household electric appliance terminal 160 such as a STB or a television or the like is used not only by the user who manipulates Web terminal 150, but also by users other than the relevant user, the attribute information and the preference information of the relevant user can be generated with increased accuracy, based on the first history information and the second history information, and can be provided to external advertisement provision system 170 and the like.

Fourth Exemplary Embodiment

Hereinafter, referring to FIGS. 15, 16A and 16B, a fourth exemplary embodiment will be described.

An information provision system in the fourth exemplary embodiment has substantially the same configuration and operation as those of the information provision system described in the third exemplary embodiment.

However, the fourth exemplary embodiment is different from the third exemplary embodiment in operation of specific-information generation server 120 as a specific-information generation device. Hereinafter, the differences will be described.

[4-1. Operation of Specific-Information Generation Device]

Figure 15:
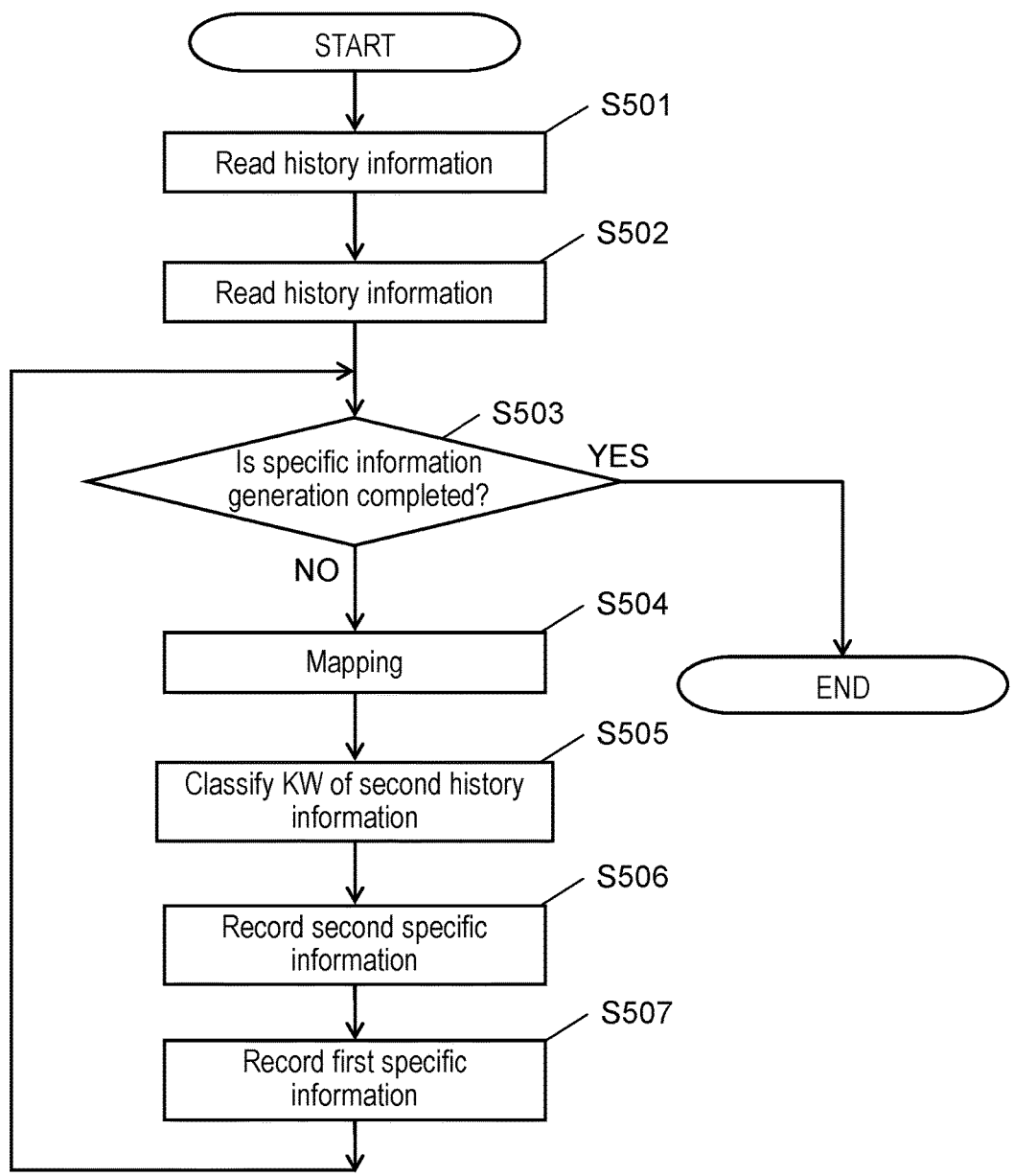
FIG. 15 is a diagram schematically showing one example of a processing flow in a specific-information generator of a specific-information generation server in a fourth exemplary embodiment.

FIG. 15 is a diagram schematically showing one example of a processing flow in specific-information generator 203 of specific-information generation server 120 in the fourth exemplary embodiment.

FIG. 16A is a diagram schematically showing one example of first specific information generated in specific-information generation server 120 and accumulated in specific-information database 204 in the fourth exemplary embodiment. FIG. 16B is a diagram schematically showing one example of second specific information generated in specific-information generation server 120 and accumulated in specific-information database 204 in the fourth exemplary embodiment.

Upon receiving a specific-information acquisition request with a specific IP address specified, which request has been transmitted from advertisement provision system 170, specific-information generator 203 reads, from history database

202, first history information and second history information regarding Web terminal 150 having the specific IP address as a network identifier (step S501).

Next, specific-information generator 203 reads, from history database 202, the first history information of Web terminal 150 having the same Web terminal identifier as the Web terminal identifier included in the read first history information (step S502). For example, in the example shown in FIG. 12, the Web terminal identifier corresponding to the IP address "AA:BB:CC:DD" is "12345678." Accordingly, specific-information generator 203 reads, from history database 202, the first history information corresponding to the IP address "JJ:KK:LL:MM" of the same Web terminal identifier "12345678" as the relevant Web terminal identifier.

Specific-information generator 203 determines whether or not the generation of the specific information has been completed for all the network identifiers (step S503). The following series of processing is performed until the generation of the specific information is completed for all the network identifiers (No in step S503).

If the first history information of one network identifier includes a plurality of Web terminal identifiers, specific-information generator 203 performs the following series of processing for each of the first history information of each of the Web terminal identifiers. This enables specific-information generator 203 to generate the specific information of each of Web terminals 150, even when a plurality of Web terminals 150 (e.g., Web terminal 150*a*, Web terminal 150*b*) respectively used by a plurality of users exist in in-home network 82.

Next, specific-information generator 203 maps the keywords included in the read first history information and second history information in a map of a thesaurus prepared in advance (step S504). This map of the thesaurus is substantially similar to the map of the thesaurus shown in FIG. 7 in the first exemplary embodiment.

Next, specific-information generator 203 classifies the keywords of the second history information into two, based on distances from the keyword included in the first history information (distances on the map of the thesaurus) (step S505). Specifically, specific-information generator 203 classifies the keywords of the second history information into the keyword(s) of the second history information having a distance (the distance on the map of the thesaurus) smaller than a predetermined distance from the keyword included in the first history information (the keyword determined to have a small distance), and the keyword(s) of the second history information having a distance larger than or equal to the predetermined distance (the keyword determined to have a large distance). This "distance" is synonymous with the "distance" described in the first exemplary embodiment. While the predetermined distance is, for example, "4," the predetermined distance is desirably set properly in accordance with a specification or the like of specific-information generation server 120, and is not limited to "4."

Next, specific-information generator 203 associates the keyword of the second history information that is not in a "relation between a broader term and a narrower term" with the keyword included in the first history information, and the keyword of the second history information that is determined to have the large distance in step S505 on the disposition in the map of the thesaurus with predetermined attribute data and preference data. Specific-information generator 203 records the corresponding attribute data and preference data on specific-information database 204 as the predetermined network identifier and the second specific information (the latent attribute information and preference information) of Web terminal identifier (step S506). For example, in the example shown in FIGS. 4 and 7, the keyword "Fairyland" included in the second history information is the second specific information. This second specific information is the latent attribute information and preference information with respect to the predetermined network identifier. The meaning of "latent" is synonymous with "latent" described in the second exemplary embodiment. Moreover, the association between the above-described keywords of the second history information, and the attribute data and preference data is carried out by a substantially similar method to the method described in the second exemplary embodiment.

Next, specific-information generator 203 associates a keyword group (a history keyword group) left because it is not determined to be the second specific information in step S506, and the keyword of the second history information that is determined to have the small distance in step S505 with predetermined attribute data and preference data. This history keyword group is made up of the keywords of the second history information in the "relation between the broader term and the narrower term" with the keyword included in the first history information, on the disposition in the map of the thesaurus. Specific-information generator 203 records the attribute data and preference data corresponding to these keywords on specific-information database 204 as the predetermined network identifier and the first specific information (the overt attribute information and preference information) of Web terminal identifier (step S507). This first specific information is positioned substantially similarly to the specific information in the third exemplary embodiment. Moreover, the association between the above-described keywords, and the attribute data and the preference data is carried out by a substantially similar method to the method described in the second exemplary embodiment.

Specific-information generator 203 carries out the processing in steps S501 to S507 in FIG. 15 for all the network identifiers included in the first history information and the second history information. This allows the first specific information and the second specific information corresponding to each of the network identifiers and each of the Web terminal identifiers of Web terminals 150 to be recorded on specific-information database 204, as shown in FIGS. 16A and 16B. In the example shown in FIGS. 16A and 16B, while Web terminal 150 with the network identifier (the IP address) "AA:BB:CC:DD" and Web terminal 150 with "JJ:KK:LL:MM" are different in the network identifier each other, they have the same Web terminal identifier (the cookie) "12345678," and can be thus treated as one Web terminal 150.

[4-2. Effects and the Like]

As described above, in the present exemplary embodiment, the specific-information generator of the specific-information generation device is configured to determine whether the distance between the keywords is small or large, based on the disposed positions of the respective keywords disposed on the map of the thesaurus. Further, the configuration is such that the first specific information is generated, based on the keywords obtained from the access history of the Web terminal, and the keywords obtained from the manipulation history of the household electric appliance terminal, which keywords are determined to have the small distances from the keywords obtained from the access history of the Web terminal, and that the second specific information is generated, based on the keywords obtained from the manipulation history of the household electric appliance terminal, which keywords are determined to have the large distances from the keywords obtained from the access history of the Web terminal.

Thereby, in the case where a plurality of Web terminals 150 respectively used by a plurality of users exist in home, or in the case where one Web terminal 150 is used in home and outside home, even if household electric appliance terminal 160 such as a STB or a television or the like is used not only by the user who manipulates Web terminal 150 but also by users other than the relevant user, the overt attribute information and preference information of the relevant user can be generated with increased accuracy, based on the first history information and the second history information, and the latent attribute information and preference information of the relevant user can be generated, and can be provided to external advertisement provision system 170 and the like.

While in the third and fourth exemplary embodiments, the example in which as the Web terminal identifier, the cookie is used is described, the Web terminal identifier is not limited to the cookie, but another identification information may be used as the Web terminal identifier. For example, first history collection server 130 may use the identification information recorded on a local storage of Web terminal 150 as the Web terminal identifier. Alternatively, a plurality of pieces of header information such as a user agent included in a request when Web terminal 150 accesses first history collection sever 130 may be used as the Web terminal identifier.

OTHER EXEMPLARY EMBODIMENTS

As described above, the first to fourth exemplary embodiments have been described as exemplification of the technique disclosed in the present application. However, the technique in the present disclosure is not limited thereto, but can also be applied to exemplary embodiments resulting from modification, replacement, addition, omission or the like. Moreover, combining each of the components described in the first to fourth exemplary embodiments enables new exemplary embodiments to be obtained.

Hereinafter, other exemplary embodiments will be described.

Each of the components of history collector 201, specific-information generator 203, specific-information provider 205, and the like described in the first to fourth exemplary embodiments may be configured by an independent dedicated circuit, or may be configured such that a program created so as to implement the operation in each of the components is executed in a processor. Moreover, the program in this case may be acquired by download from a server or the like, or may be acquired through a predetermined recording medium (e.g., an optical disk such as a CD-ROM, a magnetic disk, a semiconductor memory or the like).

For the operation in each of the servers described in the first to fourth exemplary embodiments, centralized processing may be performed in a single server, or distributed processing may be performed in a plurality of servers.

The specific numerical values described in the first to fourth exemplary embodiments only show examples in the exemplary embodiments, and the present disclosure is not limited to these numerical values. The respective numerical values are desirably set to optimal values in accordance with specifications and the like of the servers and the system.

The present disclosure can be applied to an information provision system that provides attribute information and preference information of a user to an advertisement provision system or the like that selects a proper advertisement in accordance with an attribute and a preference of the user visiting a Web site and provides the advertisement to the user. Specifically, the present disclosure can be applied to a server, a device, a system and the like that provide user information to an advertisement provision system or the like.

What is claimed is:

1. An information provision system connected to an in-home network configured by a Web terminal and a household electric appliance terminal, and comprising a first history collection device, a second history collection device, and a specific-information generation device, wherein
the first history collection device acquires, from the Web terminal,
first history information including an access history of the Web terminal and a network identifier of the Web terminal, and
the second history collection device acquires, from the household electric appliance terminal,
second history information including a manipulation history of the household electric appliance terminal, a household electric appliance terminal identifier of the household electric appliance terminal, and a network identifier of the household electric appliance terminal,
the specific-information generation device comprises:
a history collector that acquires the first history information from the first history collection device, and the second history information from the second history collection device; and
a specific-information generator that generates specific information regarding an attribute and a preference of a user, based on the first history information and the second history information acquired in the history collector, and
the specific-information generator
disposes, on a map of a thesaurus prepared in advance, a first keyword obtained from the access history of the Web terminal, and a second keyword obtained from the manipulation history of the household electric appliance terminal, and
generates first specific information, based on a single or a plurality of the second keywords having a distance smaller than a predetermined distance from a disposed position of the first keyword disposed on the map
wherein second specific information is generated, based on the single or the plurality of the second keywords having a distance larger than or equal to the predetermined distance from the disposed position of the first keyword disposed on the map, and
wherein the information provision system provides an external advertisement provision system with:
the first specific information as overt attribute information, and
the second specific information as latent attribute information.

2. The information provision system according to claim 1, wherein the specific-information generation device comprises a specific-information provider that provides the specific information in response to a request.

3. The information provision system according to claim 1, wherein
in the first history collection device, the first history information further includes a Web terminal identifier acquired from the Web terminal, and when the network identifier of the Web terminal is changed, the specific information generator disposes, on the map, a single or a plurality of the first keywords selected based on the Web terminal identifier.

4. A specific-information generation method comprising the steps of:

acquiring first history information including an access history of a Web terminal and a network identifier of the Web terminal from a first history collection device connected to an in-home network configured by the Web terminal and a household electric appliance terminal;

acquiring second history information including a manipulation history of the household electric appliance terminal, a household electric appliance terminal identifier of the household electric appliance terminal, and a network identifier of the household electric appliance terminal from a second history collection device connected to the in-home network;

generating specific information regarding an attribute and a preference of a user, based on the acquired first history information and second history information;

providing the specific information to a transmission source of a request in response to the request transmitted from outside;

disposing, on a map of a thesaurus prepared in advance, a first keyword obtained from the access history of the Web terminal, and a second keyword obtained from the manipulation history of the household electric appliance terminal;

generating first specific information, based on a single or a plurality of the second keywords having a distance smaller than a predetermined distance from a disposed position of the first keyword disposed on the map; and generating second specific information, based on the single or the plurality of the second keywords having a distance larger than or equal to the predetermined distance from the disposed position of the first keyword disposed on the map, and wherein the specific-information generation method is provided for an external advertisement provision system with:

the first specific information as overt attribute information, and the second specific information as latent attribute information.

5. The information provision system according to claim 1, wherein second specific information is generated, based on the single or the plurality of the second keywords 1) having a distance larger than or equal to the predetermined distance from the disposed position of the first keyword disposed on the map, and 2) not being in a relation between a broader term and a narrower term with the first keyword.

6. The specific-information generation method according to claim 4, wherein second specific information is generated, based on the single or the plurality of the second keywords 1) having a distance larger than or equal to the predetermined distance from the disposed position of the first keyword disposed on the map, and 2) not being in a relation between a broader term and a narrower term with the first keyword.

* * * * *